UNITED STATES PATENT OFFICE.

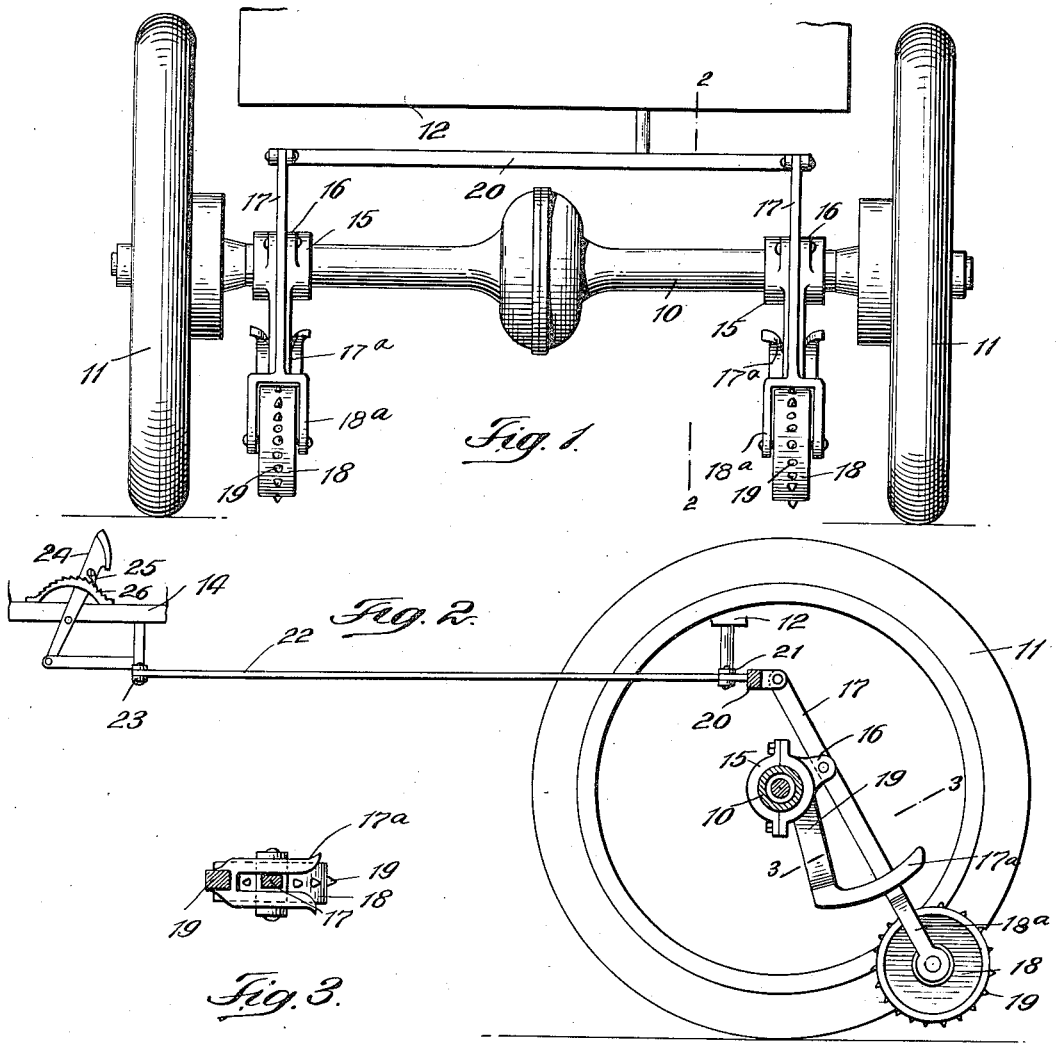

DANIEL P. DUFFIE, OF WEST NEW BRIGHTON, NEW YORK.

NON-SKID ATTACHMENT.

1,224,367.   Specification of Letters Patent.   Patented May 1, 1917.

Application filed April 13, 1915, Serial No. 20,998. Renewed December 21, 1916. Serial No. 138,287.

*To all whom it may concern:*

Be it known that I, DANIEL P. DUFFIE, a citizen of the United States, and a resident of West New Brighton, borough and county of Richmond, and State of New York, have invented certain new and useful Improvements in Non-Skid Attachments, of which the following is a description in such full, clear, and exact terms as will enable any person skilled in the art to which it pertains to make and use the same.

My invention relates to a device for preventing the skidding of automobiles, the object being to provide a mechanism which can be applied at will by the driver of the machine so that the instant he feels the machine passing out of his control he may, by the application of the non-skid mechanism, check the skidding movement.

It is further an object of my invention to arrange the mechanism so that ordinarily it is entirely out of operation and will not interfere in any way with the normal operation of the automobile.

I accomplish this end by providing one or more road gripping wheels which are intended to be raised clear of the road when not in use and which are associated with mechanism in control of the driver through a pedal or the like so that the road gripping wheels may be brought into action instantly at the will of the driver.

My invention involves various other improvements and features all of which will be set forth hereinafter and particularly pointed out in the claim.

Reference is now had to the accompanying drawings which represent, as an example, the preferred embodiment of my invention.

In these drawings—

Figure 1 is a partial rear view of an automobile with my improvement attached.

Fig. 2 is a side elevation thereof showing the rear axle of the automobile in section.

Fig. 3 is a detail section on the line 3—3 of Fig. 2, and

Fig. 4 is a plan view of the attachment excepting the pedal lever.

The invention is applicable to any automobile of standard construction or of any construction that approximates the usual standard types. In Figs. 1 and 2, 10 indicates the rear axle of the machine and 11 the rear or driving wheels. It is at the point of these wheels that skidding effect usually takes place. In Fig. 1, 12 indicates the body of the machine, and in Fig. 2, 14 indicates a part of the front platform of the machine.

To the rear axle 10, clamps 15 are attached. There are preferably two of these clamps, one near each end, and each clamp is provided with a pair of lugs 16. Between these lugs levers 17 are fulcrumed. The levers normally stand as shown in Fig. 2 and are guided by forks $17^a$ held by arms 19 which are formed on or suitably fastened to the clamps 15. These forks 18 as shown best in Fig. 3 are arranged so that the lower arms of the levers 17 will move through them freely forward and back or longitudinally of the auto, but said forks serve to prevent lateral or sidewise movement of the levers, at the same time allowing the beforementioned forward and backward movement.

The lower ends of the levers 17 have forks $18^a$ in which are mounted wheels 18. These wheels are strongly constructed of suitable metal and are furnished on their peripheries with studs 19 or other means for preventing the wheels from sliding when applied to the road bed or pavement. It will be obvious that by swinging the levers 17 the wheels 18 may be raised or lowered from the road and that when said wheels are raised they will be out of action and will not interfere with the normal operation of the automobile. When the wheels 18 are lowered into engagement with the road they will rotate idly when the auto moves forward but should the auto tend to skid or move sidewise the engagement of the wheels 18 with the pavement or road, will counteract this tendency.

The upper ends of the levers 17 are bound together by a transverse beam 20 and this beam is in turn articulated at its middle to a lever 21. This lever has one end joined to the beam 20 and the other end to a link 22. The link 22 reaches diagonally forward and is joined to a lever 23. These levers 21 and 23 are suitably hinged under the body of the auto and the long arm of the lever 23 is connected to a pedal mechanism 24 on the platform of the machine. The pedal lever has a pawl 25 working on a ratchet 26 which holds the lever in position in which it is pushed by the driver.

It will, of course, be understood that the details of the mechanism 21, 22 and 23 are not important to my invention. It is simply necessary that some means be provided for connecting the pedal with the beam 20 and these means preferably are such as will multiply the power applied to the pedal so that the wheels 19 may be engaged with the road with sufficient pressure to bring about the operation before described.

The use and operation of the invention will, it is thought, be apparent from the aforegoing description. A spring or other means may be provided if desired to hold the parts in position shown in Fig. 2 and when the driver desires to bring the non-skid device into operation it is only necessary to press forward the pedal 24 which operates the rigging 21, 22, and 23, so as to throw backward the beam 20 and carry the wheels 18 downward and forward. This engages the wheels with the road bed and, while not interfering with the forward movement of the machine, effectually prevents any sidewise or skidding movement. The non-skid wheels do not have to be kept in operation any longer than there is danger of skidding and as soon as this danger is past the operator should relax the pressure of the lever 24, thereby permitting the return of the wheels 18 to the raised or inactive position. The pawls 25 working on the ratchet 26 serve to hold the pedal lever in its forward or active position and relieve the operator of the necessity of exerting continual pressure while the wheels 18 are in operation. The pawl 25, of course is furnished with a heel piece which allows it to be disengaged from the ratchet 26 when it is desired to return the parts to inoperative position.

It will, of course, be understood that the foregoing description sets forth one of a variety of practical embodiments of my invention and that various modifications may be resorted to at will without departing from the spirit of my invention.

Having thus described my invention, what I claim as new and desire to secure by Letters Patent of the United States is:

A non-skid attachment for automobiles comprising two gripping wheels adapted to engage the roadway respectively adjacent to the rear wheels of the automobile, levers mounted on the rear axle of the automobile and revolubly carrying the wheels so that by swinging the levers the wheels may be moved in and out of engagement with the roadway, said levers being forked to straddle the gripping wheels and to carry the axle thereof, means for operating said levers to actuate the gripping wheels, and a guiding device for the levers, the same being rigidly attached to the rear axle and having a forked portion movably receiving parts of the levers for the purpose specified.

In testimony whereof I have hereunto signed my name in the presence of two witnesses.

DANIEL P. DUFFIE.

Witnesses:
 JOSEPH WAMSLEY,
 PATRICK A. BOLGER.